Dec. 2, 1924.

R. W. HICKMAN

WELL FISHING TOOL

Filed Sept. 22, 1923

1,517,426

Inventor
Ross W. Hickman

By Samuel Herrick,
Attorney

Patented Dec. 2, 1924.

1,517,426

UNITED STATES PATENT OFFICE.

ROSS W. HICKMAN, OF OKLAHOMA CITY, OKLAHOMA.

WELL FISHING TOOL.

Application filed September 22, 1923. Serial No. 664,214.

*To all whom it may concern:*

Be it known that Ross W. Hickman, citizen of the United States, residing at Oklahoma City, in the county of Oklahoma and State of Oklahoma, has invented certain new and useful Improvements in Well Fishing Tools, of which the following is a specification.

This invention relates to a well fishing tool and it has for its object to provide an improved device of this character by means of which lost tools may be fished from deep wells.

It is a well known fact that many of the fishing tools heretofore proposed for this purpose have functioned well enough in so far as grasping the lost tool is concerned but it has frequently been the case that it has been found to be impossible to dislodge the lost tool and in those cases if the well fishing tool is so constructed that it cannot release its hold upon the lost tool then the fishing tool is irretrievably lost along with the tool that it is sought to recover and, in addition, the well is so obstructed that further efforts to retrieve the lost tool are rendered futile.

The novel features of construction of the present invention will be more specifically set forth in the detailed description which follows.

Figure 1:
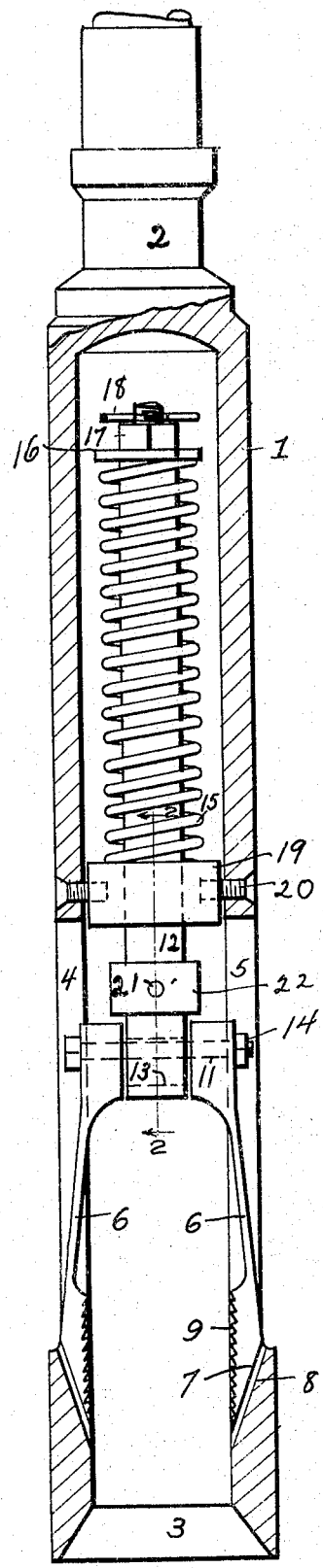
Figure 2:
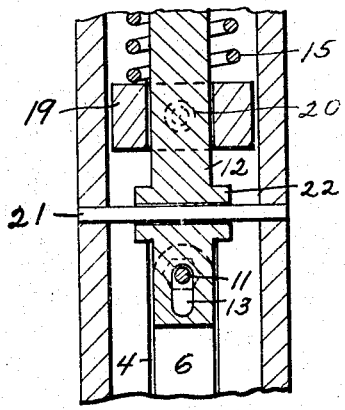

In the accompanying drawing:

Fig. 1 is a view partly in elevation and partly in section of a fishing tool constructed in accordance with the invention; and Fig. 2 is a vertical sectional view upon line 2—2 of Fig. 1.

Like numerals designate corresponding parts in both of the figures of the drawing.

In the drawing 1 represents the shank of the fishing tool. This shank is cylindrical in form and its upper end is provided with a standard tool joint. The shank is further provided with a squared portion 2 for the reception of a wrench or like tool. At its lower end the cylindrical shank is beveled, as indicated at 3, to facilitate the entry of the lost tool into said shank. The sides of the shank are slotted, as indicated at 4 and 5, and in these slotted portions the gripping members 6 are disposed. These gripping member are of spring material, such as spring steel and they are provided with inclined outer faces 7 which coact with corresponding shaped portions 8 of the shank so that if these gripping elements be adjusted downwardly they will also be forced inwardly. These gripping elements carry relatively sharp and upwardly directed teeth 9 which grip the shank of the lost tool as will be presently set forth. At their upper ends the gripping elements are traversed by a bolt 11 and by this bolt are rendered vertically adjustable with respect to a stem 12, the bolt being movable in a slot 13 formed in said stem. When a nut 14 is tightened it is manifest that the gripping elements will be bound to the lower end of the stem and that the point of binding may be varied within a limited range by providing the slot 13 as set forth. The stem 12 is encircled by a spring 15. The upper end of this spring bears against a washer 16 which is held in place by a nut 17 and cotter pin 18. The lower end of the spring bears upon a collar 19 which is supported from the shank by means of screws 20. The stem 12 is capable of limited sliding movement through the collar 19. A pin 21 traverses a collar 22, of stem 12 and the side walls of the shank, but is capable of being sheared off under certain conditions as will be presently set forth.

The operation of the device is as follows: If it be desired to retrieve a lost tool from a well the gripping elements 6 are adjusted to the approximate diameter of the lost tool which is generally known. This is effected by loosening nut 14 and adjusting the gripping jaws 6 upwardly or downwardly, as the case may be, in slot 13. These jaws tend to spring apart under their own spring action as they are raised and are forced together as they are lowered, the inclined surfaces 7 coacting with the inclined surfaces 8 of the shank as hereinbefore described. After the adjustment has been effected it is rendered permanent by tightening the nut 14. The foregoing operation of adjustment is effected through the slots 4 and is carried out with the pin 21 in place. With the pin 21 in place the spring 15 is under compression, the washer 14 having been moved toward collar 19. The tool is lowered into the well and its flared lower end guides the lost tool into the interior of the shank and as this lost tool is forced upwardly between the toothed jaws 9, the teeth of said jaws engage with the tool in such manner that withdrawal of the fishing tool will usually result in bringing the lost tool with it. However, it is sometimes the case that no amount of jerking or pulling will succeed in dislodging the lost tool and under these circumstances the fishing tool must be released from the lost tool or otherwise the fishing tool will itself be lost and the well will be additionally obstructed by its presence. Under these circumstances the pin 21 is sheared off by weight or force applied vertically to the shank and this permits the spring 15 to act to move the jaws 6 vertically with respect to the inclined teeth 8 upon the shank. It is manifest that this will result in the jaws moving apart and releasing the lost tool whereupon the fishing tool may be removed from the well.

Attention is directed to the fact that under the present construction the spring 15 is housed in such manner that it is protected from mud and water and that the construction is a very simple and inexpensive one in that the spring 15 encircles the stem 12 and is entirely separate from the jaws 6.

It is to be understood that the invention is not limited to the precise construction set forth but that it includes within its purview whatever changes fairly come within either the terms or the spirit of the appended claims.

Having described my invention what I claim is:

1. The combination with a cylindrical shank, of a stem capable of movement therein, an element carried by the shank, an element carried by the stem, a spring bearing between said elements, means for holding the spring under compression and gripping jaws carried by the stem and adjustable toward and from each other independent of the movement of the stem under the influence of the spring, or of the shank with respect to the stem.

2. In a device of the character described the combination with a shank, of a collar carried by the same, a stem movable through said collar, a spring bearing upon said collar and elements carried by the stem against which said spring bears, a pin adapted to be sheared off traversing the stem and shank and gripping jaws vertically adjustable with respect to the stem independently of the movement of said stem under the influence of the spring, or of the shank with respect to the stem.

3. A structure as recited in claim 2 wherein said gripping jaws and the shank are provided with coacting inclined surfaces by which said jaws are forced toward each other as they move downwardly with respect to the shank.

4. In a device of the character described the combination with a shank, of a collar carried by the same, a stem movable through said collar, a spring bearing upon said collar and elements carried by the stem against which said spring bears, a pin adapted to be sheared off traversing the stem and shank, a pair of gripping jaws having toothed inner faces and inclined outer faces, inclined faces upon the stem with which inclined outer faces of the jaws co-act and a bolt traversing the upper ends of the jaws at the lower end of the stem, said bolt being vertically adjustable in a vertical slot formed in the lower end of the stem to thereby adjust the jaws toward and from each other by varying the position of the inclined outer faces of the jaws with respect to the inclined faces of the stem, independently of the movement of the stem under the action of the spring.

In testimony whereof I affixed my signature in the presence of two witnesses.

ROSS W. HICKMAN.

Witnesses:
NAURINE G. BREEDEN,
ROBT. K. ERNEST.